US007128102B2

(12) United States Patent
Pendleton et al.

(10) Patent No.: US 7,128,102 B2
(45) Date of Patent: *Oct. 31, 2006

(54) DROP TUBE SEGMENTS ADAPTED FOR USE WITH A LIQUID RESERVOIR

(75) Inventors: David R. Pendleton, Fairfield, OH (US); James E. Kesterman, Cincinnati, OH (US); Kristopher A. Kane, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 252 days.

This patent is subject to a terminal disclaimer.

(21) Appl. No.: 10/836,759

(22) Filed: Apr. 30, 2004

(65) Prior Publication Data

US 2005/0241722 A1    Nov. 3, 2005

(51) Int. Cl.
*B65B 1/30* (2006.01)

(52) U.S. Cl. .................. 141/205; 141/192; 141/198; 141/301; 141/374; 137/434

(58) Field of Classification Search .............. 141/192, 141/198–205, 301, 375, 374; 137/406, 411, 137/434, 445, 446
See application file for complete search history.

(56) References Cited

U.S. PATENT DOCUMENTS

| 979,819 | A | 12/1910 | Anderson |
| 1,219,222 | A | 3/1917 | Baxter et al. |
| 1,246,033 | A | 11/1917 | Adams |
| 1,268,947 | A | 6/1918 | Fell |
| 1,289,490 | A | 12/1918 | Lundstrom |
| 1,313,386 | A | 8/1919 | Jones |
| 1,689,066 | A | 10/1928 | Baxter |
| 2,340,936 | A | 2/1944 | Cook |
| 2,499,409 | A | 3/1950 | Norway |
| 2,507,545 | A | 5/1950 | Samiran |
| 2,685,891 | A | 8/1954 | Segelhorst et al. |

(Continued)

FOREIGN PATENT DOCUMENTS

DE    1750504 A1    8/1974

(Continued)

OTHER PUBLICATIONS

European Search Report for App. No. 05009180 dated Aug. 12, 2005.

(Continued)

*Primary Examiner*—Timothy L. Maust
(74) *Attorney, Agent, or Firm*—Dinsmore & Shohl LLP

(57) ABSTRACT

A drop tube segment includes a conduit with a first end portion and a second end portion. The drop tube segment further comprises a valve assembly with a valve member associated with the first end portion, a float, and a linkage device pivotally connected with respect to the valve member. The linkage device is adapted for communication with the float such that the float may facilitate in adjusting the position of the valve member with respect to the first end portion of the conduit in response to a liquid level in a liquid reservoir. The drop tube segment further includes a fastening section located at the second end portion of the conduit for fluid tight fastening with an end portion of another drop tube segment. The fastening section comprises a sealing surface and a threaded portion adapted for threaded engagement with a threaded portion of another drop tube segment. The drop tube segment still further includes a sealing member that engages the sealing surface of the fastening section and is adapted to engage a sealing surface of another drop tube segment.

26 Claims, 9 Drawing Sheets

U.S. PATENT DOCUMENTS

| | | | |
|---|---|---|---|
| 2,811,179 | A | 10/1957 | Greenwood |
| 2,839,082 | A | 6/1958 | Moore et al. |
| 2,918,931 | A | 12/1959 | Siri |
| 2,918,932 | A | 12/1959 | Few |
| 3,078,867 | A | 2/1963 | McGillis et al. |
| 3,610,273 | A | 10/1971 | Russell |
| 3,661,175 | A | 5/1972 | Tillman |
| 3,791,407 | A | 2/1974 | Nicholls |
| 3,794,077 | A | 2/1974 | Fanshier |
| 3,963,041 | A | 6/1976 | McGillis |
| 4,308,894 | A | 1/1982 | Carpentier |
| 4,479,669 | A | 10/1984 | Hynes |
| 4,667,711 | A | 5/1987 | Draft |
| 4,793,387 | A | 12/1988 | LeBlanc et al. |
| 4,986,320 | A | 1/1991 | Kesterman et al. |
| 4,998,571 | A | 3/1991 | Blue et al. |
| 5,086,843 | A | 2/1992 | Mims et al. |
| 5,117,877 | A | 6/1992 | Sharp |
| 5,152,315 | A | 10/1992 | Lagache |
| 5,163,470 | A | 11/1992 | Maeshiba |
| 5,174,345 | A | 12/1992 | Kesterman et al. |
| 5,207,241 | A | 5/1993 | Babb |
| 5,241,983 | A | 9/1993 | Lagache |
| 5,398,735 | A | 3/1995 | Lagache |
| 5,522,415 | A | 6/1996 | Hopenfeld |
| 5,564,464 | A | 10/1996 | Pendleton et al. |
| 5,564,465 | A | 10/1996 | Pettesch |
| 5,655,565 | A | 8/1997 | Phillips et al. |
| 5,839,465 | A | 11/1998 | Phillips et al. |
| 5,887,614 | A | 3/1999 | Weeks et al. |
| 6,138,707 | A | 10/2000 | Stuart |
| 6,206,056 | B1 | 3/2001 | Lagache |
| 6,267,156 | B1 | 7/2001 | Argandona |
| 6,318,421 | B1 | 11/2001 | Lagache |
| 6,523,564 | B1 | 2/2003 | Phillips |
| 6,523,581 | B1 | 2/2003 | Pendleton et al. |
| 6,536,465 | B1 | 3/2003 | David et al. |
| 6,655,418 | B1 * | 12/2003 | McGill et al. .............. 141/1 |
| 6,669,413 | B1 | 12/2003 | Neeld et al. |
| 6,874,528 | B1 | 4/2005 | Kozik et al. |
| 6,913,047 | B1 | 7/2005 | Kane et al. |
| 2002/0179178 | A1 | 12/2002 | Pendleton et al. |
| 2004/0017081 | A1 | 1/2004 | Simpson et al. |
| 2005/0241695 | A1 | 11/2005 | Pendleton et al. |
| 2005/0241696 | A1 | 11/2005 | Kane et al. |
| 2005/0241723 | A1 | 11/2005 | Pendleton et al. |
| 2005/0254910 | A1 | 11/2005 | Kane et al. |

FOREIGN PATENT DOCUMENTS

| | | |
|---|---|---|
| DE | 8805087 U1 | 6/1988 |
| DE | 19941820 C1 | 2/2001 |
| FR | 1360869 | 4/1964 |
| FR | 1377087 A | 10/1964 |
| FR | 1526790 A | 5/1968 |
| FR | 2194908 A | 3/1974 |
| FR | 2197161 A | 3/1974 |
| FR | 2205166 | 5/1974 |
| FR | 2270198 | 12/1975 |
| FR | 2331732 | 6/1977 |
| FR | 2355736 | 1/1978 |
| GB | 0966842 A | 8/1964 |
| GB | 1444260 | 7/1976 |
| GB | 1531083 | 1/1978 |
| GB | 2064041 A | 6/1981 |
| GB | 2309767 A | 8/1997 |

OTHER PUBLICATIONS

*OPW Instructions* —Assembly and Installation Instructions for OPW 61-SO and 61-SOM Carb Required Overfill Prevention Valves; pp. 1-11; Jan. 1993.

*Polymod® Elastomer Sealing Materials*, Chris M.A. Chilson, Jun. 15, 2000.

*Parker Total Sealing Systems*, Parker Seal Group, Irvine, CA, 1989.

*Parker PolyPak Seals*.

* cited by examiner

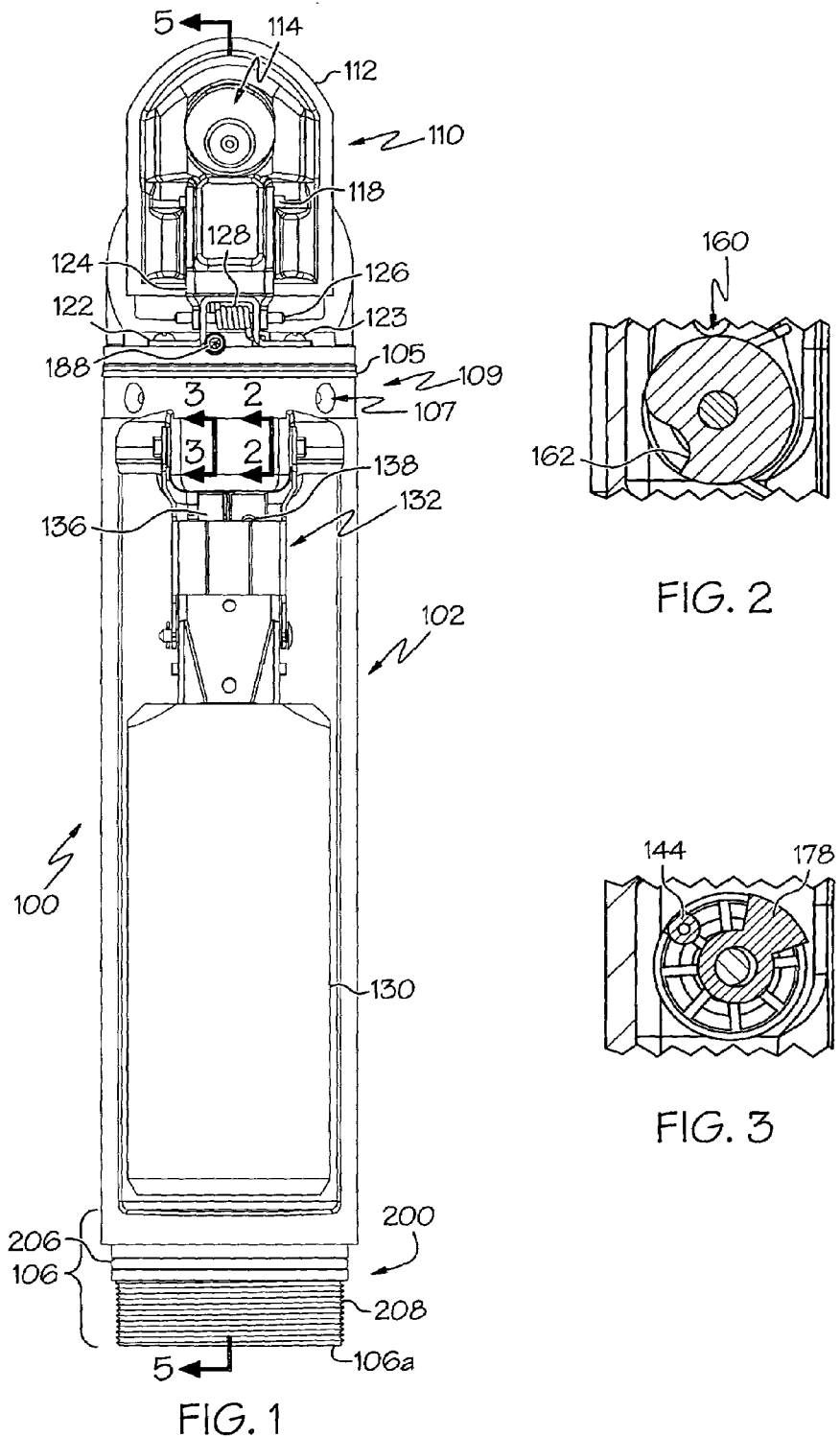

DROP TUBE SEGMENTS ADAPTED FOR USE WITH A LIQUID RESERVOIR

TECHNICAL FIELD

The present invention relates generally to drop tube segments, and more particularly to drop tube segments including a fastening section for use with a liquid reservoir.

BACKGROUND OF THE INVENTION

Our increasingly mobile and mechanized society uses a variety of different fuels (e.g., gasoline, diesel fuel, ethanol, etc.) as energy. Liquid fuels are generally stored in liquid reservoirs such as underground storage tanks, above ground tanks, or any of a variety of different containers. Typically, liquid fuel reservoirs have inlets and outlets through which fuel can be added to and/or removed from the reservoir. These inlets and outlets may typically consist of a riser pipe extending from the reservoir. Internal to the riser pipe is a drop tube that typically includes an overfill valve adapted to respond once a predetermined level is reached in the liquid reservoir. To simplify manufacture and assembly, it is also known to provided the drop tube in a plurality of segments that are fastened together in series to form an overall drop tube assembly. As shown in U.S. Pat. No. 4,986,320, for example, the drop tube assembly includes an intermediate drop tube segment having opposed ends that are each correspondingly fastened to an upper and lower drop tube segment with fasteners extending through the respective walls of the segments.

Such configurations have proven to be very effective. To further enhance the beneficial nature of previous drop tube assemblies, there is a desire to provide a substantially fluid tight seal at the fastening location between the drop tube segments. A fluid tight seal may reduce or prevent fluid, such as vapor, from being released from the ullage area of the reservoir to the interior of the drop tube that might act as a chimney to vent the fluid to the surrounding atmosphere and potentially create an environmental concern.

To address potential concerns of vapor leakage, it is known to provide fastening sections with an epoxy layer to provide a fluid-tight seal at potential leak points. For example, it is known to provide a drop tube assembly, as shown in U.S. Pat. No. 4,986,320, with a fastening arrangement as shown in FIGS. 15A or 15B of the drawings herein. Each conventional fastening arrangement illustrated in FIGS. 15A and 15B includes a layer of Loctite® epoxy-sealant for use as a cold weld bonding compound. As shown in FIG. 15A, a first drop tube segment 400 is known to include a first fastening section 402 with a tapered exterior threaded portion 408. A second drop tube segment 420 is also known to include a second fastening section comprising an adapter 424 that is fastened to an end of a tubular member 422 at a weld seam 423. The adapter 424 includes a tapered interior threaded portion 428 that threadedly engages tapered exterior threaded portion 408 of the first drop tube segment 400. In order to provide a fluid-tight seal, an epoxy layer 410 may be applied between mating portions of the threaded portions.

FIG. 15B illustrates another conventional fastening arrangement that includes a first drop tube segment 500 including a first fastening section 502 including a groove 508 receiving a resilient O-ring 506 and a shoulder 504 that acts as a registration stop for a second drop tube segment 520. The second drop tube segment 520 is also known to include a tubular member 522 that is inserted over the first fastening section 502 until an end of the tubular member 522 abuts the shoulder 504 of the first fastening section 502. A fastener 512 is inserted through an aperture 524 in the tubular member 522 to engage an aperture 509 defined in the first fastening section 502. In order to provide a fluid seal, an epoxy layer 510a may be applied to the first fastening section 502 prior to assembly of the first and second drop tube segments. The epoxy layer 510a is often required due to inconsistencies in the clearance between outer dimensions of the first fastening section 502 and inner dimensions of the tubular member 522. Any inconsistencies may be caused by imperfections in the outer end and/or damage to the outer end of the tubular member 522 due to the typically thin aluminum walls of the tubular member 522 which render the outer ends prone to deformation. Another epoxy layer 510b may also be applied to the area over and about the head of the fastener 512 to prevent fluid leakage through the apertures 509, 524.

Application of an epoxy layer to provide fluid-tight sealing has proven very beneficial to reduce fluid vapor leakage. However, the addition of an epoxy layer typically greatly lengthens the installation process and the epoxy layer must cure for an extended period of time before the drop tube assembly may be installed with respect to the liquid reservoir. Currently, there is a need for drop tube assemblies that comprise a plurality of sections that may be connected together for immediate installation with respect to the liquid reservoir while providing a fluid seal at the fastening location between the drop tube segments.

SUMMARY OF THE INVENTION

Accordingly, it is an aspect of the present invention to obviate problems and shortcomings of conventional drop tube assemblies. More particularly, it is an aspect of the present invention to provide a drop tube segment with a fastening section that provides a fluid tight seal to inhibit, such as prevent, fluid leakage to the surrounding atmosphere that might otherwise create an environmental concern. It is a further aspect of the present invention to provide a drop tube segment with a fastening section that provides a fluid tight seal without necessarily requiring the use of an epoxy sealant that involves extensive curing time.

To achieve the foregoing and other aspects and in accordance with the present invention, a drop tube segment is provided and adapted for use with a liquid reservoir. The drop tube segment includes a conduit with a first end portion and a second end portion. The drop tube segment further comprises a valve assembly with a valve member associated with the first end portion, a float, and a linkage device pivotally connected with respect to the valve member. The linkage device is adapted for communication with the float such that the float may facilitate in adjusting the position of the valve member with respect to the first end portion of the conduit in response to a liquid level in a liquid reservoir. The drop tube segment further includes a fastening section located at the second end portion of the conduit for fluid tight fastening with an end portion of another drop tube segment. The fastening section comprises a sealing surface and a threaded portion adapted for threaded engagement with a threaded portion of another drop tube segment. The drop tube segment still further includes a resilient sealing member that engages the sealing surface of the fastening section and is adapted to engage a sealing surface of another drop tube segment.

To achieve further aspects and in accordance with the present invention, a drop tube segment is provided that includes a conduit with a first end portion and a second end portion. The drop tube segment further includes a valve assembly with a valve member associated with the first end portion, a float, and a linkage device pivotally connected with respect to the valve member. The linkage device is adapted for communication with the float such that the float may facilitate in adjusting the position of the valve member with respect to the first end portion of the conduit in response to a liquid level in a liquid reservoir. The drop tube segment further includes a fastening section located at the second end portion of the conduit for fluid tight fastening of the second end portion of the conduit to an end portion of another drop tube segment. The fastening section comprises a first outer cylindrical surface including a first outer diameter, a second outer cylindrical surface including a second outer diameter that is less than the first outer diameter, and an annular shoulder adapted to act as a registration stop for another drop tube segment. The annular shoulder is defined by a transition between the first outer cylindrical surface and the second outer cylindrical surface. The fastening section also includes an annular groove, defined by the second outer cylindrical surface, that includes a sealing surface and is offset from an outer end of the drop tube segment. The fastening section still further includes an outer threaded portion adapted for threaded engagement with an inner threaded portion of another drop tube segment. The drop tube segment further comprises an annular sealing member engaging the sealing surface and at least partially disposed in the annular groove.

To achieve still further aspects and in accordance with the present invention, a drop tube assembly is provided and adapted for use with a liquid reservoir. The drop tube assembly comprises a first drop tube segment including a first conduit with a first end portion and a second end portion. The first drop tube segment further comprises a valve assembly with a valve member associated with the first end portion, a float, and a linkage device pivotally connected with respect to the valve member. The linkage device is adapted for communication with the float such that the float may facilitate in adjusting the position of the valve member with respect to the first end portion in response to a liquid level in a liquid reservoir. The first drop tube segment further includes a first fastening section located at the second end portion of the first conduit. The first fastening section comprises a first sealing surface and a first threaded portion. The drop tube assembly further includes a second drop tube segment comprising a second conduit including a first end portion and a second end portion. The second drop tube segment further includes a second fastening section located at the first end portion of the second conduit. The second fastening section comprises a second sealing surface and a second threaded portion. At least part of the first threaded portion is threadedly engaged with at least part of the second threaded portion. The drop tube assembly further includes a resilient sealing member engaging the first and second sealing surfaces.

To achieve yet further aspects and in accordance with the present invention, a drop tube assembly is provided with a first drop tube segment. The first drop tube segment includes a first conduit with a first end portion and a second end portion. The first drop tube segment further includes a valve assembly with a valve member associated with the first end portion, a float, and a linkage device pivotally connected with respect to the valve member. The linkage device is adapted for communication with the float such that the float may facilitate in adjusting the position of the valve member with respect to the first end portion of the first conduit in response to a liquid level in a liquid reservoir. The first drop tube segment further includes a first fastening section located at the second end portion of the first conduit. The first fastening section includes a first interface surface with at least a portion of the first interface surface including a first threaded portion. The drop tube assembly further includes a second drop tube segment. The second drop tube segment comprises a second conduit including a first end portion and a second end portion. The second drop tube segment further comprises a second fastening section located at the first end portion of the second conduit. The second fastening section includes a second interface surface with at least a portion of the second interface surface including a second threaded portion. At least part of the first threaded portion is threadedly engaged with at least part of the second threaded portion. The first and second fastening sections and the first and second conduits cooperate to form a fluid conduit with an internal fluid pathway. The first and second interface surfaces also extend between the internal fluid pathway and an external location of the drop tube assembly. The drop tube assembly further comprises a sealing member interposed between the first and second interface surfaces. The sealing member is located external to at least a portion of the threadedly engaged parts of the first and second threaded portions.

Advantages and novel features of the present invention will become apparent to those skilled in the art from the following detailed description, which simply illustrates various modes and examples contemplated for carrying out the invention. As will be realized, the invention is capable of other different aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

FIG. 1 is a front elevational view of a drop tube segment in accordance with one exemplary embodiment of the present invention;

FIG. 2 is a sectional view of the drop tube segment along line 2—2 of FIG. 1, illustrating portions of an exemplary cam member;

FIG. 3 is a sectional view of the drop tube segment along line 3—3 of FIG. 1, illustrating portions of an exemplary driver member and linkage device;

DETAILED DESCRIPTION OF EXEMPLARY EMBODIMENTS

The various exemplary embodiments of the invention may be used to provide a valve system for a wide variety of applications. For example, the various exemplary embodiments of the invention may be used to provide overfill valve systems for use in a liquid reservoir, such as a liquid storage tank. In one particular example, features of the exemplary embodiments herein may be used in addition, or in place of, features disclosed in U.S. Pat. No. 4,986,320, which is herein incorporated entirely by reference. U.S. Pat. No. 4,986,320 is referred to throughout this application as "the referenced patent".

Figure 4:
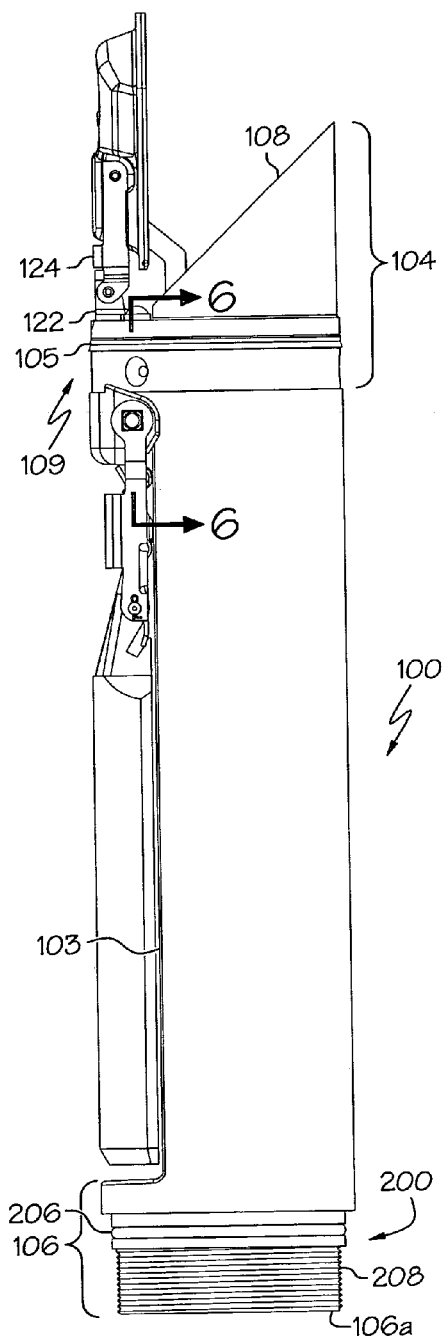
FIG. 4 is a right side elevational view of the drop tube segment of FIG. 1.
Figure 5:
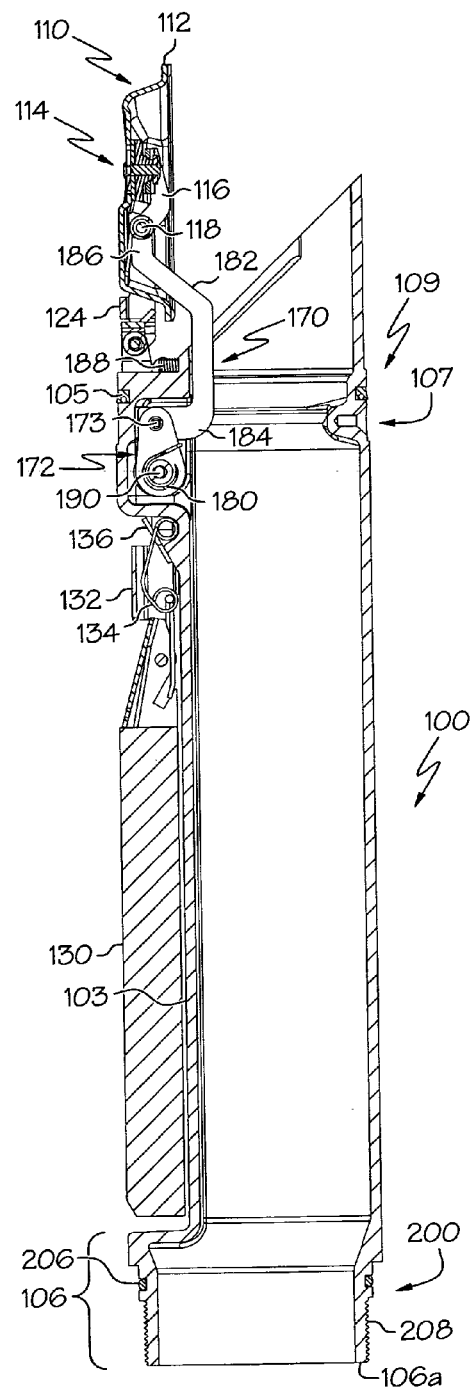
FIG. 5 is a sectional view of the drop tube segment along line 5—5 of FIG. 1.

Attention will now be directed to various exemplary embodiments of the invention. Concepts of exemplary embodiments are illustrated in the accompanying drawings, wherein like numerals indicate the same elements throughout the views. With reference to FIGS. 1, 4 and 5, a drop tube segment 100 in accordance with one embodiment of the present invention is disclosed. The drop tube segment 100 includes a conduit 102 with a first end portion 104 and a second end portion 106. The conduit 102 may be formed from a wide variety of materials and by various processes. In one exemplary embodiment, the conduit 102 may be formed from aluminum with a casting process. As shown, the exemplary conduit 102 can have a general cylindrical shape and may include a notched portion 103 to accommodate a float 130 as shown in FIGS. 4 and 5.

The drop tube segment 100 further includes a valve assembly, such as the exemplary valve assembly 110 illustrated and described herein. The concepts of the present invention can alternatively be used with various conventional valve assemblies. For example, general features and concepts of the conventional valve assembly described in the referenced patent may be incorporated in the drop tube segment 100 for use with the inventive concepts of the present invention.

As shown in FIGS. 1, 4, 5 and 9, the exemplary valve assembly 110 includes a one-piece mounting bracket 122 for attachment to the first end portion 104 of the conduit 102. As shown, a pair of screws 123 may be used to fasten the one-piece mounting bracket 122 to the first end portion 104. The valve assembly 110 further includes a valve member 112. As shown, the one-piece mounting bracket 122 is used to associate the valve member 112 with the first end portion 104 of the conduit 102. The one-piece mounting bracket 122 facilitates pivotal association between the valve member 112 and the first end portion 104 such that the valve member 112 may pivot to engage a valve seat 108 of the conduit 102. An H-shaped pivot link 124 may also be used to pivotally associate the valve member 112 with respect to the first end portion 104. As shown, one end portion of the H-shaped pivot link 124 may be pivotally attached to the valve member 112 with a shaft 118 while the other end portion of the H-shaped pivot link 124 may be pivotally attached to the one-piece mounting bracket 122 with another shaft 126. A torsion spring 128 is adapted to bias the valve member 112 out of a closed position against the valve seat 108.

Figure 9:
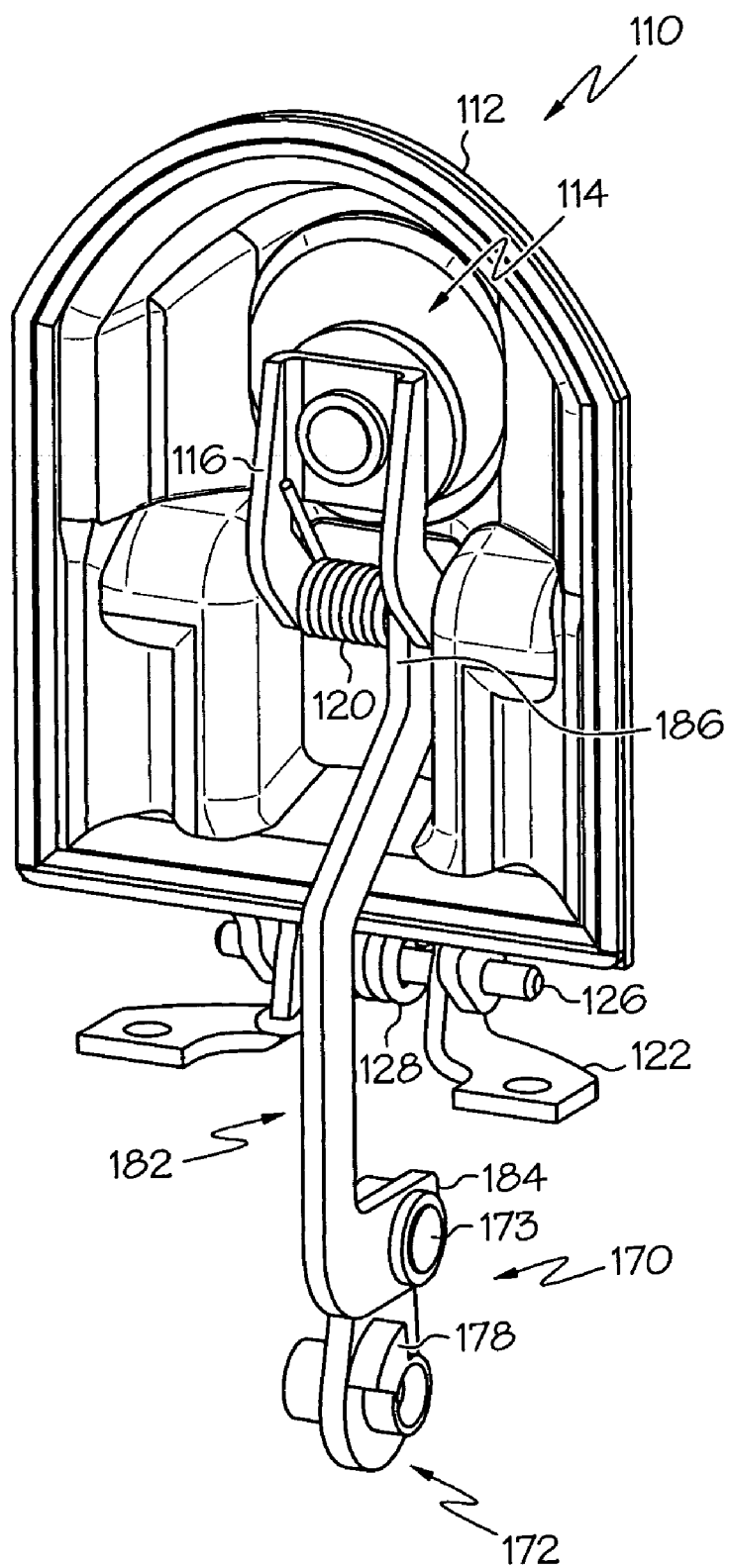
FIG. 9 illustrates a perspective view of the valve member and linkage device from the drop tube segment of FIG. 1.
Figure 10:
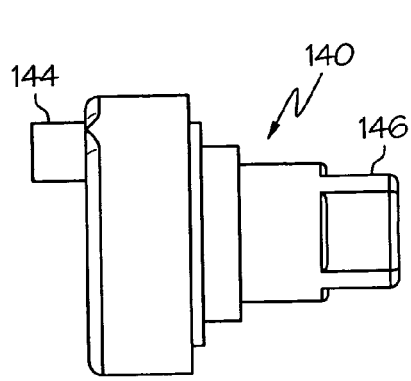
FIG. 10 illustrates a front elevational view of a driver member from the drop tube assembly of FIG. 1.
Figure 11:
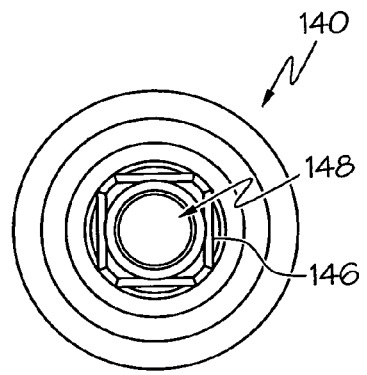
FIG. 11 illustrates a right side elevational view of the driver member of FIG. 10.
Figure 12:
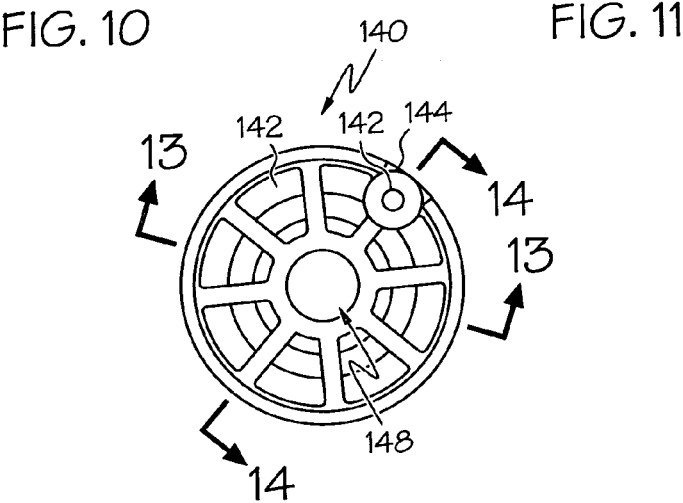
FIG. 12 illustrates a left side elevational view of the driver member of FIG. 10.
Figure 13:
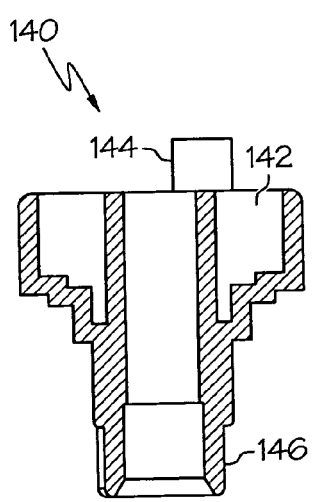
FIG. 13 illustrates a sectional view of the driver member along line 13—13 of FIG. 12.
Figure 14:
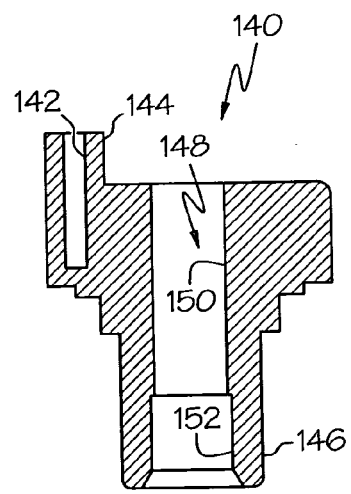
FIG. 14 is a sectional view of the driver member along line 14—14 of FIG. 12.
Figure 15A:
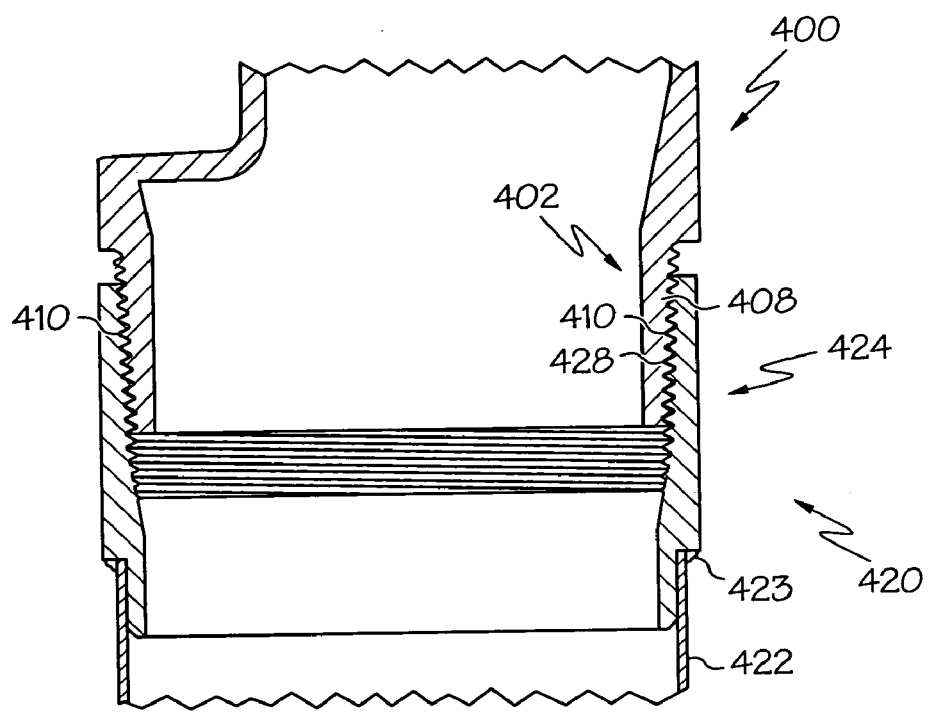
FIG. 15A illustrates a conventional fastening arrangement between an intermediate drop tube segment and a lower drop tube segment.
Figure 15B:
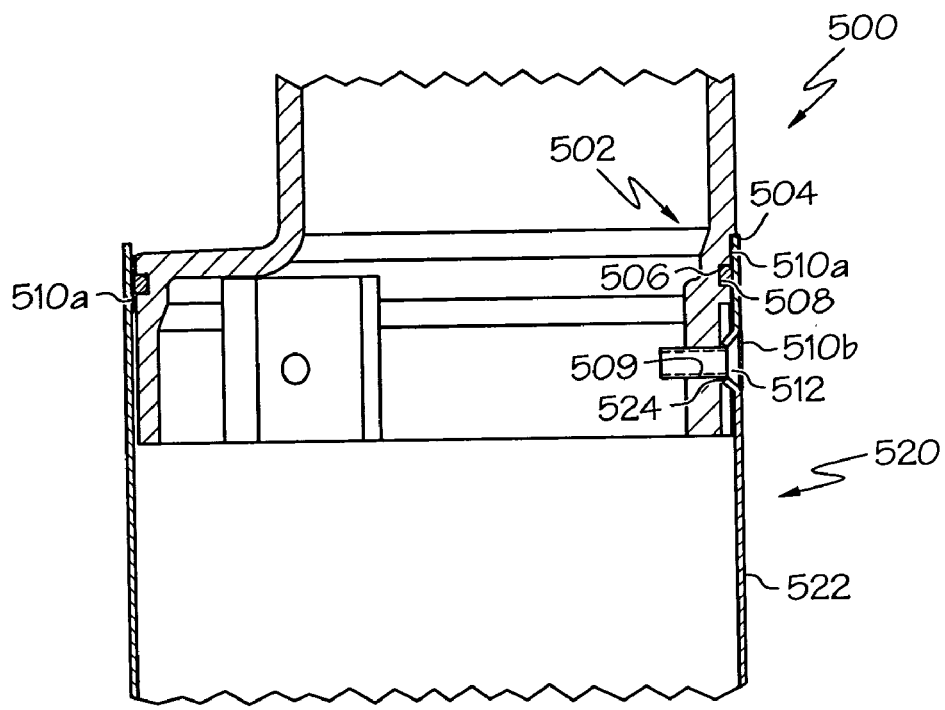
FIG. 15B illustrates another conventional fastening arrangement between an intermediate drop tube segment and a lower drop tube segment.

The valve member 112 can also be provided with a poppet valve 114 similar to the valve member and poppet valve disclosed in the reference patent. The poppet valve 114 includes a pivot link 116 and is provided with a torsion spring 120 to bias the poppet valve 114 to a closed position as shown in FIG. 9. The shaft 118 is also adapted to pivotally attach the poppet valve 114 to the valve member 112.

Figure 6:
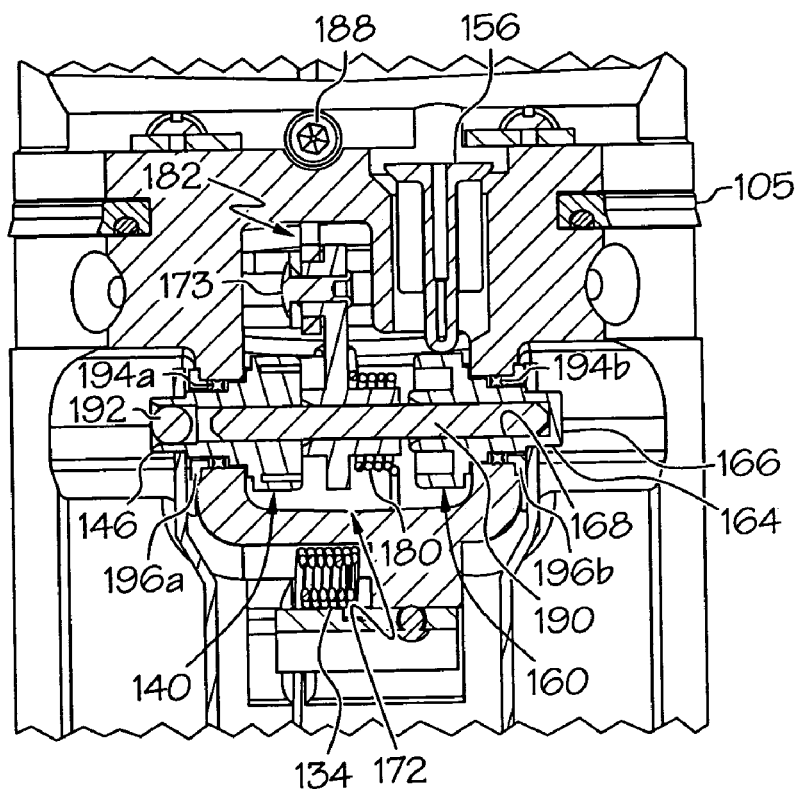
FIG. 6 is a sectional view of the drop tube segment along line 6—6 of FIG. 4.

As illustrated in FIGS. 5 and 9, the valve assembly 110 further includes a linkage device 170 that is pivotally connected with respect to the valve member 112 and adapted for communication with the float 130 such that the float may facilitate in adjusting the position of the valve member 112 with respect to the first end portion 104 of the conduit 102 in response to a liquid level in the liquid reservoir 360. The linkage device 170 can include a first link 172 and a second link 182. The second link 182 includes a first end portion 184 attached to the first link 172 with a pivot pin 173 and a second end portion 186 attached to the valve member 112 with the shaft 118. As shown in FIG. 6, the first link 172 is also rotatably mounted with respect to the conduit 102 with a shaft 190.

The linkage device 170 is further provided with a torsion spring 180 for biasing the valve member 112 to the open position illustrated in FIGS. 1, 4 and 5. As shown, an adjustable stop member 188 may also be provided to limit movement of the second link 182. As discussed in the referenced patent, it may be desirable to position the adjustable stop member 188 such that the pivot pin 173 is located off-center with respect to the shaft 190. For example, as shown in FIG. 5, the pivot pin 173 is permitted to rotate sufficiently counter clockwise such that it is located in an off-center position with respect to the shaft 190. The off-center position effectively locks the valve member 112 in the open position to resist movement in response to a downward force applied to the valve member 112.

The valve assembly 110 further includes the previously-mentioned float 130 that facilitates adjustment of the position of the valve member 112 with respect to the first end portion 104 of the conduit 102 in response to a liquid level in the liquid reservoir 360. As shown in FIG. 5, the float 130 may be biased outwardly by a biasing spring 134. The biasing spring 134 may press against a float link 132 to initially bias the float 130 into the angular position illustrated in FIG. 17. Biasing the float 130 to an initial angular position increases the lever angle of the float 130 to allow a reliable response to a predetermined liquid level in the liquid reservoir that might not otherwise occur if the float 130 is retracted within the notch portion 103 of the conduit 102. As shown in FIG. 1, a spring retainer 136 may be fastened to the conduit 102 with a fastener 138 to position the biasing spring 134 with respect to the conduit 102.

Figure 7:
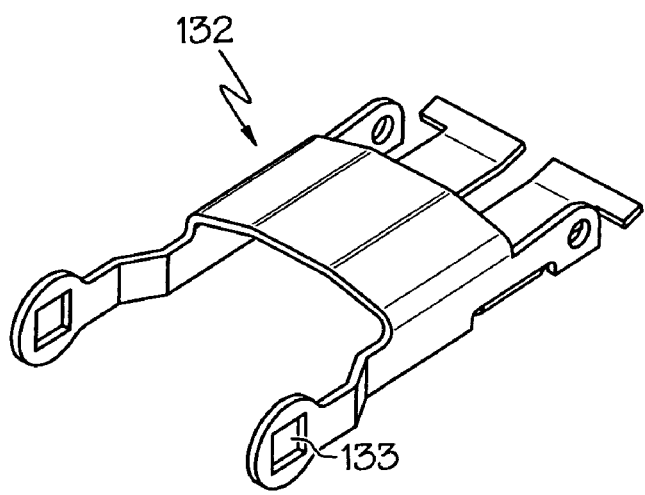
FIG. 7 is a perspective view of the float link of the drop tube segment of FIG. 1.

The float 130 may comprise an elongated body molded from any suitable material and may further include the previously-mentioned float link 132 designed to act as a safety link to provide a failure point to prevent otherwise expensive damage that might occur if the float 130 is forced to an over-pivoted position. As shown in FIG. 7, the float link 132 includes a pair of noncircular apertures 133 adapted to engage pivot bearings of the drop tube segment 100. In one illustrated exemplary embodiment, the pivot bearings can include a driver member 140 and/or a cam member 160. A wide variety of driver members and/or cam members may be used with the concepts of the present invention. In one exemplary embodiment, the driver member and/or cam member disclosed in the referenced patent may be used with the concepts of the present invention. Further examples of driver members and/or cam members that can be used with the concepts of the present invention are described with reference to FIGS. 6, 8 and 10–14. As shown, the driver member 140 and the cam member 160 are each adapted to nonrotatably engage a corresponding one of the noncircular apertures 133 of the float link 132 such that a pivoting movement of the float 130 causes a corresponding rotational movement of each of the driver member 140 and the cam member 160 about a pivot axis.

As shown in FIGS. 10–14, the driver member 140 can include a noncircular coupling extension 146 having a shape for cooperation with one of the noncircular apertures 133 of the float link 132 to be nonrotatably received therein. The driver member 140 further includes a drive pin 144 that is offset from a rotational axis of the driver member 140. The drive pin 144 is adapted to engage an extension 178 of the linkage device 170 (see FIGS. 3 and 9) when the float 130 sufficiently pivots relative to the conduit 102 in a manner similar to the arrangement disclosed in the referenced patent. The driver member 140 further includes a through aperture 148 with a first portion 150 adapted to receive a portion of the shaft 190 and a second portion 152 adapted to receive a closure member 192 as shown in FIG. 6. The closure member 192 and the driver member 140 might be formed from stainless steel, aluminum, plastics, rubbers, or other material that has the ability to provide sufficient corrosion resistance when exposed to fluid used in association with the liquid reservoir. In one particular embodiment, the closure member 192 may comprise stainless steel to provide a press-fit closure. In another example, the driver member 140 may comprise a Celcon or BASF material to further provide wear resistance. The driver member 140 may also include a plurality of hollow areas 142 to provide a substantially constant wall thickness to facilitate formation of the driver member 140 by an injection molding process.

Figure 8:
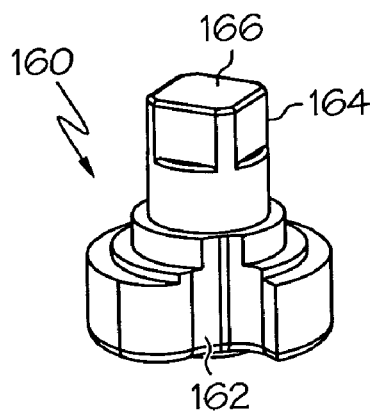
FIG. 8 illustrates a perspective view of the cam member from the drop tube segment of FIG. 1.

An exemplary cam member 160 is shown in FIGS. 2, 6 and 8 and can be formed from the same or similar material used to form the driver member 140 discussed above. The cam member 160 includes a noncircular coupling extension 164 having a shape for cooperation with one of the noncircular apertures 133 of the float link 132 to be nonrotatably received therein. The cam member 160 further includes a cam surface 162 adapted to control the position of a poppet valve 156 in a manner similar to the poppet valve disclosed in the referenced patent. As shown in FIG. 6, the cam member 160 may further include an aperture 168 with an integrally closed end 166. The aperture 168 is designed to receive a portion of the shaft 190, prevent fluid leakage between the shaft and the cam member 160 and trap the shaft between the integrally closed end 166 of the aperture 168 and the closure member 192 received by the driver member 140.

As further illustrated in FIG. 6, the drop tube segment 100 may be provided with a sealing member 194a, such as a quad ring sealing member, between the driver member 140 and the conduit 102. Similarly, another sealing member 194b, such as a quad ring sealing member, may be provided between the cam member 160 and the conduit 102. The sealing members 194a, 194b may be beneficial to inhibit, such as prevent, fluid leakage from the interior of the drop tube segment 100. Respective retainers 196a, 196b may also be provided to trap the sealing members 194a, 194b into position while also provide a bearing surface for the float link 132. As shown, the retainers 196a, 196b may have an extension for press fitting into corresponding apertures in the conduit 102.

Figure 17:
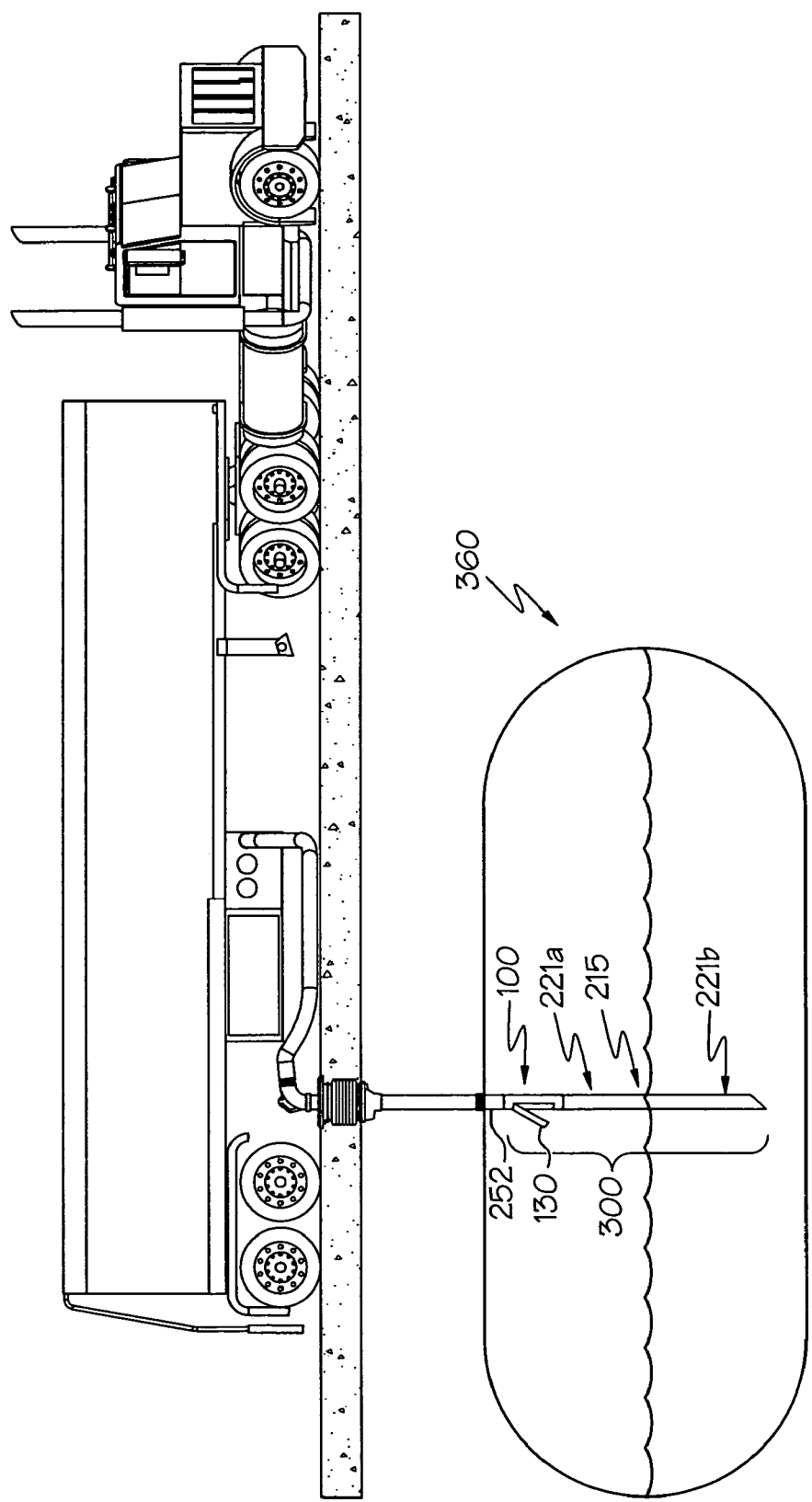
FIG. 17 illustrates an exemplary overfill valve system installed with respect to a liquid reservoir in accordance with the present invention.

The first end portion 104 may further include a fastening section 109 with a fastener receiving structure 107 adapted to facilitate attachment between the drop tube segment 100 and another drop tube segment 252 that may be arranged as an upper drop tube segment as illustrated in FIG. 17. As illustrated, the fastening section 109 may further include a sealing member 105 adapted to provide a fluid tight connection between the drop tube segment 100 and the upper drop tube segment 252.

The second end portion 106 may further include another fastening section 200 adapted to facilitate attachment between the first drop tube segment 100 and a second drop tube segment 215 that may be arranged as a lower drop tube segment as illustrated in FIG. 17. Various alternative fastening sections are described, with reference to FIGS. 16A–16D, that may be used to attach the first drop tube segment 100 to a second drop tube segment to form a drop tube assembly.

Figure 16A:
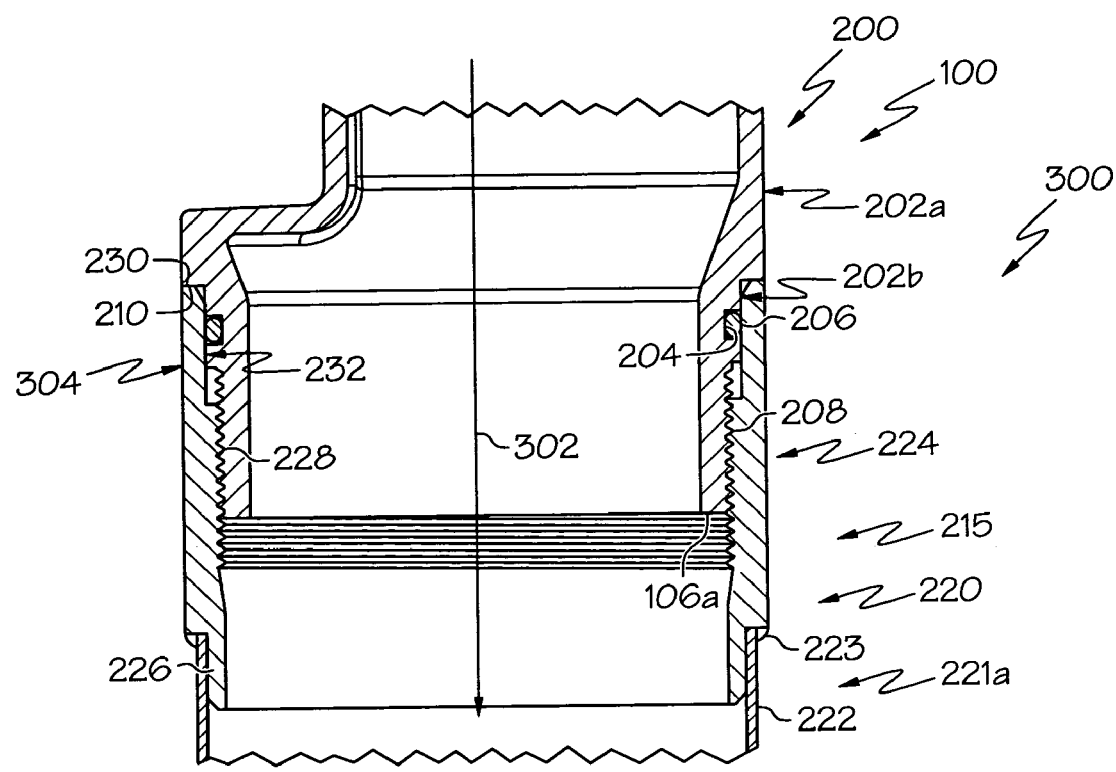
FIG. 16A illustrates a drop tube assembly in accordance with a first exemplary embodiment of the present invention wherein a first fastening section of a first drop tube segment is threadedly engaged with a second fastening section of a second drop tube segment.

FIG. 16A depicts an exemplary drop tube assembly 300 in accordance with an exemplary embodiment of the present invention. The drop tube assembly 300 includes the previously mentioned first drop tube segment 100 fastened to the second drop tube segment 215. The first fastening section 200 is located at the second end portion 106 of the first conduit 102. The first fastening section 200 includes a first interface surface with a first sealing surface for engaging a sealing member 206. The first sealing surface might comprise a flat and/or cylindrical surface and can include any surface adapted to engage the sealing member 206. In one particular embodiment, the first interface surface comprises a optional groove 204 that includes the first sealing surface (e.g., the base and/or one or more sides of the groove) wherein the sealing member 206 is at least partially disposed in the groove 204 to engage the first sealing surface. As shown, the groove 204 can comprise an annular groove but might comprise other shapes depending on the particular application.

The second drop tube segment 215 includes a second conduit 220 with a first end portion 221a and a second end portion 221b (see FIG. 17). The second drop tube segment 215 further includes a second fastening section, such as an adapter 224, located at the first end portion 221a of the second conduit 220. The adapter 224 is optional wherein it is possible to form the second fastening section together with the remainder of the second conduit as a one-piece member. However, as shown, providing a separate adapter 224 that is later attached to an end of a tubular member 222 may be particularly beneficial when providing a threaded portion on an end of a relatively thin walled tubular member. The adapter 224 may also comprise a rigid structure that can present a sealing surface with precise dimensions to enhance the fluid tight seal with a sealing member without requiring an epoxy sealant layer. Still further, the adapter 224 may also be desirable to simplify formation of interface characteristics, such as an inner threaded portion, that might otherwise require additional expense when formed with larger components.

The adapter 224, if provided, may include an insert collar 226 adapted to facilitate attachment of the adapter 224 with the tubular member 222. As shown, the insert collar 226 is adapted to be inserted into an end portion of the tubular member 222. A weld seam 223 may then be provided to attach the adapter 224 to the tubular member 222. To prevent leakage, the weld seam 223 may comprise a continuous weld seam about the periphery of the interface between the tubular member 222 and the adapter 224.

The second fastening section includes a second interface surface with a second sealing surface 232, wherein the sealing member 206 is adapted to simultaneously engage the first and second sealing surfaces. The second sealing surface 232 might comprise a flat and/or cylindrical surface and can include any surface adapted to engage the sealing member 206. For example, as shown in FIG. 16A, the second sealing surface 232 is a cylindrical surface located on an inner surface of the second drop tube segment 215.

In order to assist in fastening the first drop tube segment 100 to the second drop tube segment 215, the first interface surface is further provided with a first threaded portion 208 and the second interface surface is further provided with a second threaded portion 228. As shown, at least part of the first threaded portion 208 is adapted to be threadedly engaged with at least part of the second threaded portion 228. As shown in FIG. 16A, for example, once at least part of the first threaded portion 208 is threadedly engaged with at least part of the second threaded portion 228, the sealing member 206 is interposed between the first and second interface surfaces and engages the first and second sealing surfaces while being located external to at least a portion of the threadedly engaged parts of the first and second threaded portions 208, 228. As further shown, the first and second fastening sections and the first and second conduits cooperate to form a fluid conduit with an internal fluid pathway 302. The first and second interface surfaces are shown to extend between the internal fluid pathway 302 and an external location 304 of the drop tube assembly 300.

As illustrated in the exemplary embodiments, the threaded portions can comprise straight threads wherein the first drop tube segment 100 and the second drop tube segment 215 may be threaded together until a limit is reached. In the particular embodiment shown in FIG. 16A, the first fastening section 200 includes a shoulder 210 that acts as a registration stop. As shown, the first fastening section 200 includes a first outer surface 202a including a first outer dimension and a second outer surface 202b including a second outer dimension that is less than the first outer dimension. The illustrated shoulder 210 is defined by a transition between the first outer surface 202a and the second outer surface 202b. The shoulder 210 acts as a registration stop for the second drop tube segment 215 to limit the extent to which the first drop tube segment 100 may be threaded to the second drop tube segment 215. Therefore, as shown, the second drop tube segment 215 may be threaded onto the first drop tube segment 100 until an outer end 230 of the second drop tube segment 215 abuts the shoulder 210 of the first fastening section 200.

Although not shown, in additional exemplary embodiments, a surface of the optional shoulder of any of the embodiments herein might include the sealing surface for engaging the sealing member. For example, the first sealing surface of the first fastening section can comprise at least a portion of a shoulder and the second sealing surface of the second fastening section can comprise an end portion, such as an outer end, of the second drop tube segment. Therefore, in accordance with the concepts of the present invention, the sealing member can be at least partially disposed between a portion of the shoulder of one drop tube segment and an end portion of another drop tube segment such that the sealing member engages a sealing surface of the shoulder of one drop tube segment and a sealing surface of another drop tube segment.

Figure 16B:
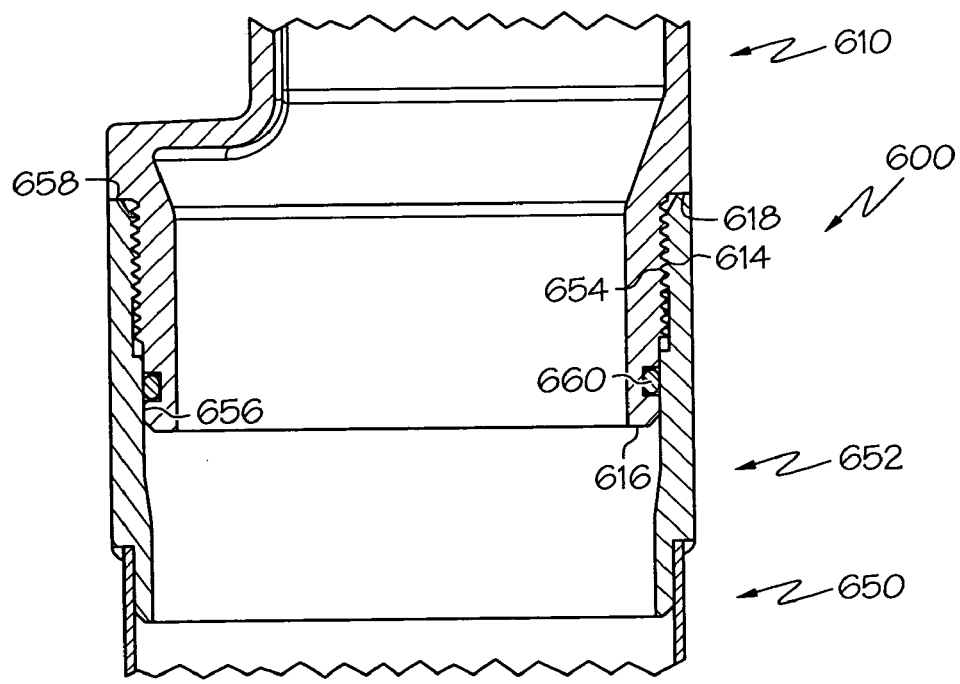
FIG. 16B illustrates a drop tube assembly in accordance with a second exemplary embodiment of the present invention wherein a first fastening section of a first drop tube segment is threadedly engaged with a second fastening section of a second drop tube segment.
Figure 16C:
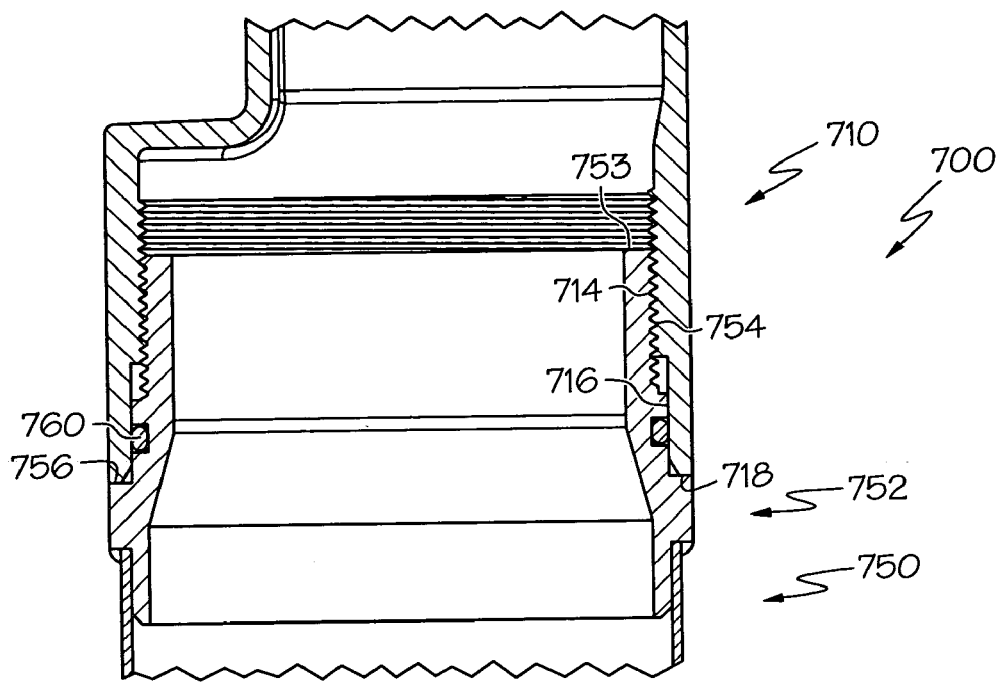
FIG. 16C illustrates a drop tube assembly in accordance with a third exemplary embodiment of the present invention wherein a first fastening section of a first drop tube segment is threadedly engaged with a second fastening section of a second drop tube segment.
Figure 16D:
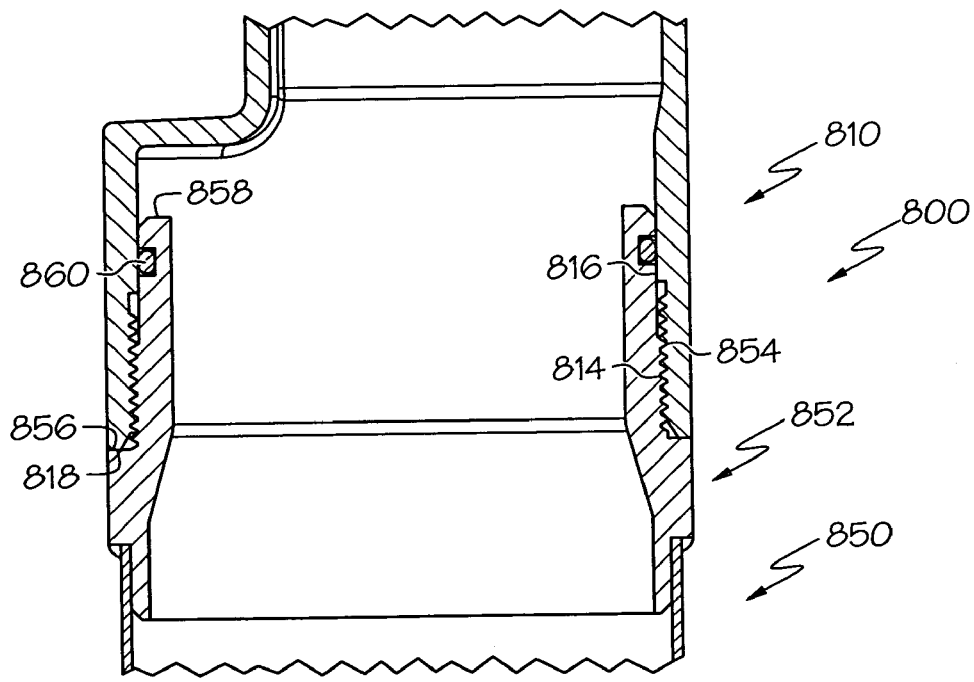
FIG. 16D illustrates a drop tube assembly in accordance with a fourth exemplary embodiment of the present invention wherein a first fastening section of a first drop tube segment is threadedly engaged with a second fastening section of a second drop tube segment.

As further shown in FIG. 16A, the first threaded portion 208 is located on an outer surface of the first drop tube segment 100 while the second threaded portion 228 is located on an inner surface of the adapter 224. Similarly, as shown in FIG. 16B, another drop tube assembly 600 is provided wherein a first threaded portion 614 is located on an outer surface of a first drop tube segment 610 while a second threaded portion 654 is located on an inner surface of an adapter 652 of a second drop tube segment 650. Providing the adapter with the threaded portion on the inner surface may simplify fabrication of the interior threads. However, in additional embodiments, the first threaded portion may be located on an inner surface of the first drop tube segment while the second threaded portion may be located on an outer surface of the second drop tube segment. For example, FIG. 16C depicts a drop tube assembly 700 wherein a first threaded portion 714 may be located on an inner surface of a first drop tube segment 710 while a second threaded portion 754 may be located on an outer surface of an adapter 752 of a second drop tube segment 750. Similarly, as shown in FIG. 16D, another drop tube assembly 800 includes a first threaded portion 814 located on an inner surface of a first drop tube segment 810 while a second threaded portion 854 is located on an outer surface of an adapter 852 of a second drop tube segment 850.

As shown in FIG. 16A, the sealing member 206 may be offset from an outer end 106a of the first drop tube segment 100 such that the first threaded portion 208 is located between the sealing member 206 and the outer end 106a of the first drop tube segment 100. In the particular embodiment shown, the sealing member 206 can also be disposed between the shoulder 210 and the first threaded portion 208. As further illustrated in FIG. 16A, the second sealing surface 232 is located between the outer end 230 of the second drop tube segment 215 and the second threaded portion 228. Locating the first threaded portion 208 between the sealing member 206 and the outer end 106a of the first drop tube segment 100 and locating the second sealing surface 232 between the outer end 230 of the second drop tube segment 215 and the second threaded portion 228 may be desirable to protect the sealing member 206 during installation procedures. Indeed, with the arrangement discussed above, the sealing member 206 is positioned such that it cannot be damaged by the second threaded portion 228 when fastening the first drop tube segment 100 to the second drop tube segment 215.

Similarly, as shown in FIG. 16C, a sealing member 760 may be offset from an outer end 753 of a second drop tube segment 750 such that the second threaded portion 754 is located between the sealing member 760 and the outer end 753 of the second drop tube segment 750. In the particular embodiment shown, the sealing member 760 can also be disposed between a shoulder 756 and the second threaded portion 754. As further illustrated in FIG. 16C, a first sealing surface 716 is located between an outer end 718 of the first drop tube segment 710 and the first threaded portion 714. Locating the second threaded portion 754 between the sealing member 760 and the outer end 753 of the second drop tube segment 750 and locating the first sealing surface 716 between the outer end 718 of the first drop tube segment 710 and the first threaded portion 714 may also be desirable to protect the sealing member 760 during installation procedures. For instance, with the arrangement discussed above, the sealing member 760 is positioned such that it cannot be damaged by the first threaded portion 714 when fastening the first drop tube segment 710 to the second drop tube segment 750.

Alternatively, as shown in the embodiment of FIG. 16B, a sealing member 660 might also be located between the first threaded portion 614 and an outer end 616 of the first drop tube segment 610 while the first threaded portion 614 is disposed between a shoulder 618 and the sealing member 660. As further illustrated in FIG. 16B, the second threaded portion 654 is located between an outer end 658 of the second drop tube segment 650 and second sealing surface 656. During installation procedures, it may be important to avoid contacting the sealing member 660 with the second threaded portion 654 to prevent damage to the sealing member 660.

Similarly, as shown in the embodiment of FIG. 16D, a sealing member 860 is located between the second threaded portion 854 and an outer end 858 of the second drop tube segment 850 while the second threaded portion 854 is disposed between a shoulder 856 and the sealing member 860. As further illustrated in FIG. 16D, the first threaded portion 814 is located between a first sealing surface 816 and an outer end 818 of the first drop tube segment 810. During installation procedures, it may also be important to avoid contacting the sealing member 860 with the first threaded portion 814 to prevent damage to the sealing member 860.

The optional grooves depicted in the various illustrated exemplary embodiments herein (i.e., groove 204) include a base and two opposed sides. Further exemplary grooves of embodiments of the present invention, if provided, might alternatively comprise a variety of shapes designed to facilitate placement of a sealing member with respect to a fastening section. For example, although not shown, exemplary grooves might comprise a V-shaped groove, a rounded groove with an arcuate configuration, or other shapes.

In addition, FIGS. 16A and 16B illustrate the first interface surface comprising the groove while FIGS. 16C and 16D illustrate the second interface surface comprising the groove. The groove in each of FGS. 16A–16D faces outwardly from its respective interface surface. Providing the groove such that it faces outwardly might be desirable to more effectively maintain the sealing member within the outwardly facing groove. In alternative embodiments, however, the groove may be provided on the other interface surface. In particular, the second interface surface might comprise the groove in FIGS. 16A and 16B and the first interface surface might comprise the groove in FIGS. 16C and 16D. In these alternative embodiments, each of the grooves of FIGS. 16A–16D face inwardly from its respective interface surface.

Sealing members (e.g., sealing member 206) described throughout this application can comprise a resilient annular O-ring that can be formed a wide variety of materials such as an elastomer. Certain sealing members might comprise a PolyPak® seal available from Parker-Hannifin, Corp. It is understood that additional exemplary sealing members might comprise a nonannular shape, for example, to match the shape of the sealing surface. In additional embodiments, a nonresilient sealing member might be used wherein the seal is obtained by compressing, such as crushing the sealing member. However, a resilient sealing member might be desirable to allow repeated breakdown and refastening of the drop tube segments without replacing the sealing member. Still further, sealing members other than O-rings may be used.

The foregoing description of the various examples and embodiments of the invention has been presented for the purposes of illustration and description. It is noted that a wide variety of additional embodiments may incorporate the concepts of the present invention. For example, additional embodiments of the invention may include inventive concepts presented herein in combination with features and concepts disclosed in U.S. Pat. No. 4,986,320. The description of the various examples and embodiments of the invention is not intended to be exhaustive or to limit the invention to the precise form disclosed. Many alternatives, modifications and variations will be apparent to those skilled in the art. Accordingly, this invention is intended to embrace all alternatives, modifications and variations that have been discussed herein, and others that fall within the spirit and broad scope of the claims.

We claim:

1. A drop tube segment adapted for use with a liquid reservoir, the drop tube segment comprising:
   a) a conduit including a first end portion and a second end portion;
   b) a valve assembly including:
      i) a valve member associated with the first end portion,
      ii) a float,
      iii) a linkage device pivotally connected with respect to the valve member and adapted for communication with the float such that the float may facilitate in adjusting the position of the valve member with respect to the first end portion of the conduit in response to a liquid level in a liquid reservoir;
   c) a fastening section located at the second end portion of the conduit for fluid tight fastening with an end portion of another drop tube segment, the fastening section comprising a sealing surface and a threaded portion adapted for threaded engagement with a threaded portion of another drop tube segment; and
   d) a resilient sealing member engaging the sealing surface of the fastening section, wherein the resilient sealing member is configured not to be axially compressed between the sealing surface of the fastening section and a sealing surface of another drop tube segment engaging the resilient sealing member.

2. The drop tube segment of claim 1, wherein the fastening section comprises a groove including the sealing surface, wherein the resilient sealing member is at least partially disposed in the groove.

3. The drop tube segment of claim 1, wherein the fastening section includes a shoulder adapted to act as a registration stop for another drop tube segment.

4. The drop tube segment of claim 3, wherein the resilient sealing member is disposed between the shoulder and the threaded portion of the fastening section.

5. The drop tube segment of claim 3, wherein the fastening section includes a first outer surface including a first outer dimension and a second outer surface including a second outer dimension that is less than the first outer dimension, wherein the shoulder is defined by a transition between the first outer surface and the second outer surface.

6. The drop tube segment of claim 1, wherein the resilient sealing member is offset from an outer end of the drop tube segment, wherein at least a portion of the fastening section that includes the threaded portion is located between the resilient sealing member and the outer end.

7. A drop tube segment adapted for use with a liquid reservoir, the drop tube segment comprising:
   a) a conduit including a first end portion and a second end portion;
   b) a valve assembly including:
      i) a valve member associated with the first end portion,
      ii) a float,
      iii) a linkage device pivotally connected with respect to the valve member and adapted for communication with the float such that the float may facilitate in adjusting the position of the valve member with respect to the first end portion of the conduit in response to a liquid level in a liquid reservoir,
   c) a fastening section located at the second end portion of the conduit for fluid tight fastening of the second end portion of the conduit to an end portion of another drop tube segment, the fastening section comprising:
      i) a first outer cylindrical surface including a first outer diameter,
      ii) a second outer cylindrical surface including a second outer diameter that is less than the first outer diameter,
      iii) an annular shoulder adapted to act as a registration stop for another drop tube segment, wherein the annular shoulder is defined by a transition between the first outer cylindrical surface and the second outer cylindrical surface,
      iv) an annular groove defined by the second outer cylindrical surface, the annular groove including a sealing surface and is offset from an outer end of the drop tube segment, and
      v) an outer threaded portion adapted for threaded engagement with an inner threaded portion of another drop tube segment; and
   d) an annular sealing member engaging the sealing surface and at least partially disposed in the annular groove.

8. The drop tube segment of claim 7, wherein at least a portion of the fastening section that includes the outer threaded portion is located between the annular sealing member and the outer end.

9. A drop tube assembly adapted for use with a liquid reservoir, the drop tube assembly comprising:
   a) a first drop tube segment comprising:
      i) a first conduit including a first end portion and a second end portion,
      ii) a valve assembly including a valve member associated with the first end portion, a float, and a linkage device pivotally connected with respect to the valve member and adapted for communication with the float such that the float may facilitate in adjusting the position of the valve member with respect to the first end portion in response to a liquid level in a liquid reservoir, and
      ii) a first fastening section located at the second end portion of the first conduit, the first fastening section comprising a first sealing surface and a first threaded portion;
   b) a second drop tube segment comprising:
      i) a second conduit including a first end portion and a second end portion, and
      ii) a second fastening section located at the first end portion of the second conduit, the second fastening section comprising a second sealing surface and a second threaded portion, wherein at least part of the first threaded portion is threadedly engaged with at least part of the second threaded portion; and
   c) a resilient sealing member engaging the first and second sealing surfaces.

10. The drop tube assembly of claim 9, wherein the first threaded portion is located on an outer surface of the first drop tube segment and wherein the second threaded portion is located on an inner surface of the second drop tube segment.

11. The drop tube assembly of claim 9, wherein the second sealing surface is located on an inner surface of the second drop tube segment.

12. The drop tube assembly of claim 9, wherein the second sealing surface is located between an outer end of the second drop tube segment and the second threaded portion.

13. The drop tube assembly of claim 9, wherein the resilient sealing member is offset from an outer end of the first drop tube segment.

14. The drop tube assembly of claim 13, wherein the first threaded portion is located between the resilient sealing member and the outer end of the first drop tube segment.

15. The drop tube assembly of claim 14, wherein the second sealing surface is located between an outer end of the second drop tube segment and the second threaded portion.

16. The drop tube assembly of claim 9, wherein the second drop tube segment includes a tubular member and an adapter attached to an end of the tubular member.

17. The drop tube assembly of claim 16, wherein the adapter includes the second threaded portion and the second sealing surface.

18. The drop tube assembly of claim 9, wherein at least one of the first and second drop tube segments includes a shoulder adapted to act as a registration stop for the other of the first and second drop tube segments.

19. The drop tube assembly of claim 18, wherein the first fastening section includes the shoulder adapted to act as a registration stop for the second drop tube segment.

20. The drop tube assembly of claim 19, wherein the resilient sealing member is disposed between the shoulder and the first threaded portion.

21. The drop tube segment of claim 19, wherein the first fastening section includes a first outer surface including a first outer dimension and a second outer surface including a second outer dimension that is less than the first outer dimension, wherein the shoulder is defined by a transition between the first outer surface and the second outer surface.

22. A drop tube assembly adapted for use with a liquid reservoir, the drop tube assembly comprising:
a) a first drop tube segment comprising:
   i) a first conduit including a first end portion and a second end portion;
   ii) a valve assembly including a valve member associated with the first end portion, a float, and a linkage device pivotally connected with respect to the valve member and adapted for communication with the float such that the float may facilitate in adjusting the position of the valve member with respect to the first end portion of the first conduit in response to a liquid level in a liquid reservoir, and
   iii) a first fastening section located at the second end portion of the first conduit, the first fastening section including a first interface surface with at least a portion of the first interface surface including a first threaded portion;
b) a second drop tube segment comprising:
   i) a second conduit including a first end portion and a second end portion, and
   ii) a second fastening section located at the first end portion of the second conduit, the second fastening section including a second interface surface with at least a portion of the second interface surface including a second threaded portion, at least part of the first threaded portion being threadedly engaged with at least part of the second threaded portion with the first and second fastening sections and the first and second conduits cooperating to form a fluid conduit with an internal fluid pathway, the first and second interface surfaces extending between the internal fluid pathway and an external location of the drop tube assembly; and
c) a sealing member interposed between the first and second interface surfaces with the sealing member being located external to at least a portion of the threadedly engaged parts of the first and second threaded portions.

23. The drop tube assembly of claim 22, wherein the first interface surface comprises a groove with the resilient sealing member being at least partially disposed in the groove.

24. The drop tube assembly of claim 22, wherein at least one of the first and second drop tube segments includes a shoulder adapted to act as a registration stop for the other of the first and second drop tube segments.

25. The drop tube assembly of claim 22, wherein the first threaded portion is located on an outer surface of the first drop tube segment and wherein the second threaded portion is located on an inner surface of the second drop tube segment.

26. The drop tube assembly of claim 22, wherein the sealing member is offset from an outer end of the first drop tube segment, wherein at least part of the first interface surface that includes the first threaded portion is located between the sealing member and the outer end.

* * * * *

UNITED STATES PATENT AND TRADEMARK OFFICE
CERTIFICATE OF CORRECTION

PATENT NO.       : 7,128,102 B2                                   Page 1 of 1
APPLICATION NO.  : 10/836759
DATED            : October 31, 2006
INVENTOR(S)      : David R. Pendleton et al.

It is certified that error appears in the above-identified patent and that said Letters Patent is hereby corrected as shown below:

Claim 1, column 12, line 44 - change "afloat" to --a float--.

Signed and Sealed this

Sixth Day of March, 2007

JON W. DUDAS
*Director of the United States Patent and Trademark Office*